United States Patent
Quijano et al.

(10) Patent No.: US 9,218,019 B2
(45) Date of Patent: Dec. 22, 2015

(54) MOUNTING DEVICE

(71) Applicant: HEWLETT-PACKARD DEVELOPMENT COMPANY, L.P., Houston, TX (US)

(72) Inventors: David Quijano, Fort Collins, CO (US); Paul L Drew, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 13/871,943

(22) Filed: Apr. 26, 2013

(65) Prior Publication Data

US 2014/0321039 A1 Oct. 30, 2014

(51) Int. Cl.
G06F 1/16 (2006.01)
F16M 11/20 (2006.01)
F16M 13/02 (2006.01)

(52) U.S. Cl.
CPC .............. *G06F 1/1601* (2013.01); *F16M 11/20* (2013.01); *F16M 13/02* (2013.01); *G06F 1/16* (2013.01); *G06F 1/1607* (2013.01); *F16M 2200/08* (2013.01); *G06F 2200/1631* (2013.01)

(58) Field of Classification Search
CPC ..... G11B 33/127; F16M 11/20; F16M 11/04; F16M 11/041; F16B 21/065; F16B 21/071
USPC ............ 361/679.01, 679.02, 679.22, 679.32; 248/118.3, 121, 161, 219, 3, 221.11, 248/297.51, 297.21, 407–410, 917–919
See application file for complete search history.

(56) References Cited

U.S. PATENT DOCUMENTS

| | | | |
|---|---|---|---|
| 7,193,843 B2 | 3/2007 | Hsu | |
| 2005/0236533 A1 | 10/2005 | McRight et al. | |
| 2006/0076463 A1 | 4/2006 | Drew | |
| 2008/0232044 A1 | 9/2008 | Moscovitch | |
| 2009/0039221 A1* | 2/2009 | Powers et al. | 248/220.21 |
| 2010/0123059 A1 | 5/2010 | Saez | |
| 2011/0180674 A1 | 7/2011 | Bliven et al. | |
| 2012/0025046 A1 | 2/2012 | Yen | |
| 2013/0058030 A1* | 3/2013 | Mabon | 361/679.32 |

OTHER PUBLICATIONS

Craig Simms, "Dell UltraSharp U2711," Mar. 5, 2010, 18 p. [Online] http://www.cnet.com.au/dell-ultrasharp-u2711-339301091.htm.
HPDC, "HP ZR30w LCD Monitor—Setting Up the Monitor," HP Support Document, 9 p., Copyright 2013 Hewlett-Packard Development Company, L.P. [Online] http://h2000.www2.hp.com/bizsupport/TechSupport/Document.jsp?lang=en&cc=us&taskId=120 . . . .
Inhouse Computers PN Ltd, "AOC VESA Monitor Stand With Height Adjustment, Pivot, Swivel & T," 1 p., downloaded Mar. 21, 2013. [Online] http://www.inhouse.co.nz/product.php?c=268 &p=4499.

* cited by examiner

*Primary Examiner* — Tuan T Dinh
*Assistant Examiner* — Mukund G. Patel
(74) *Attorney, Agent, or Firm* — Conley Rose (57) ABSTRACT

An example mounting structure in accordance with one implementation of the present disclosure includes an engagement assembly to mount within a pass-through tunnel of a support stand for an electronic display. The structure further includes a mounting bracket coupled to the engagement assembly. The mounting bracket provides a mounting surface for an electronic device.

20 Claims, 11 Drawing Sheets

MOUNTING DEVICE

BACKGROUND

Computing devices are used today for a wide variety of functions and applications, and often employ the use of visual displays in order to convey information to a user or operator thereof. In addition, many modern computing devices also employ additional components or accessories such as, for example, external hard drives, thin client devices, additional displays, etc.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct mechanical connection or through an indirect mechanical connection via other devices and connections. As used herein, the terms "connecting member" and "coupling member" refer to any device or member for mating or coupling two or more components to one another such as, for example, screws, bolts, nails, pins, rivets, an adhesive or some combination thereof. Also, as used herein, the terms "approximately," "substantially," and "generally" mean+/−10%.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

As previously described, many modern computing devices employ various components or accessories. For such devices, it is desirable to mount or place the accessory near the visual display of the computing device in order to achieve a higher level of efficiency in the total spacing requirements of the computing device as well as to provide ease of access for the user to the accessory during operations. Thus, examples disclosed herein present a mounting device for mounting an accessory or component proximate the visual display of a computing device.

Figure 1:
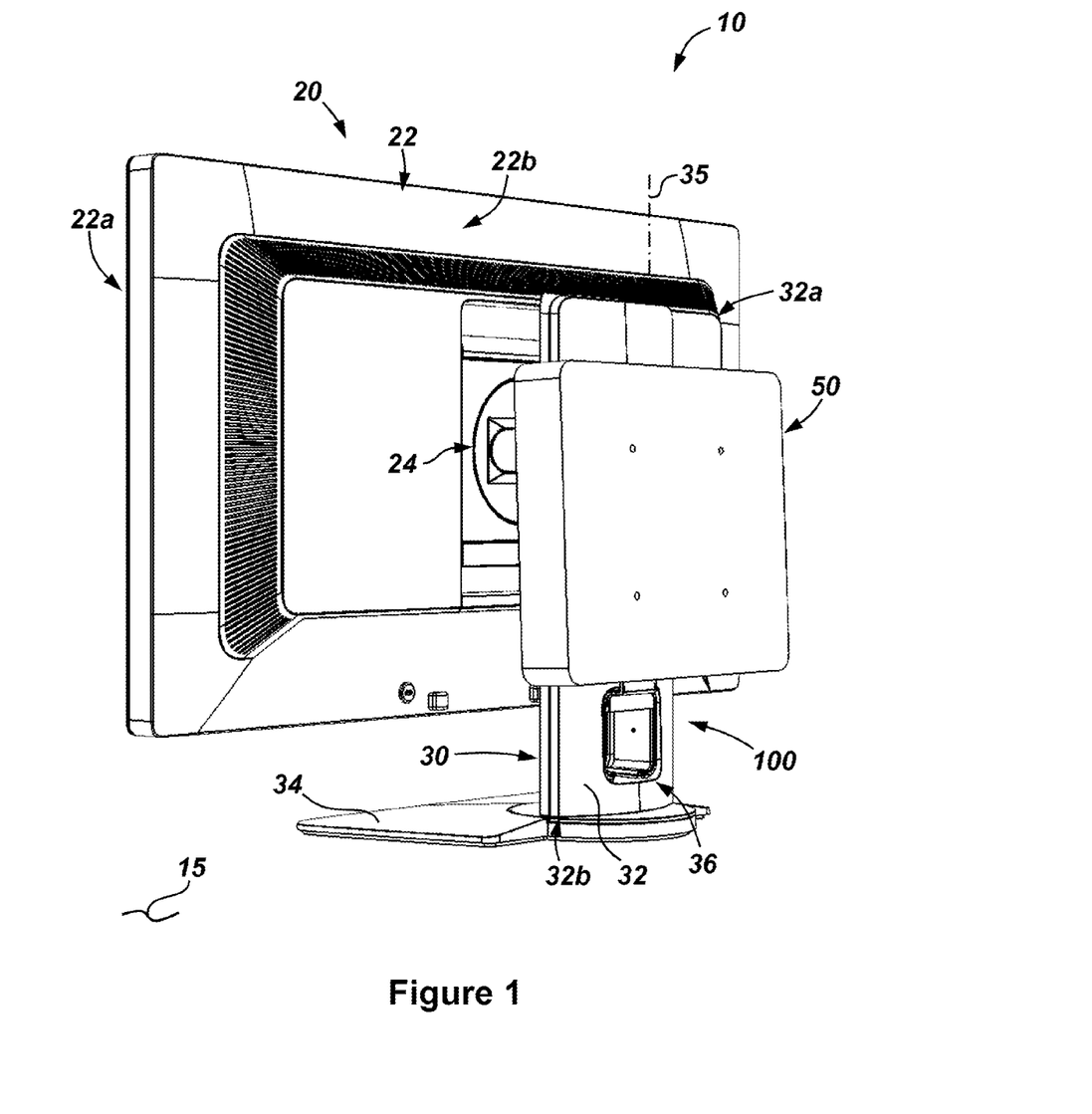
FIG. 1 is a perspective view of a computer system utilizing a mounting device for coupling an electronic device thereto in accordance with the principles disclosed herein.
Figure 2:
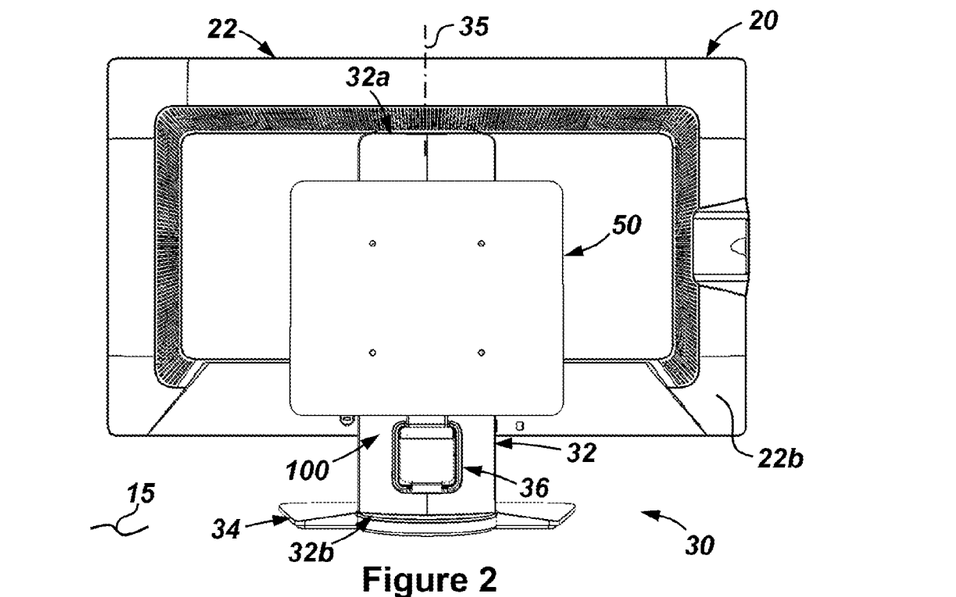
FIG. 2 is a rear view of the computer system of FIG. 1 in accordance with the principles disclosed herein.
Figure 3:
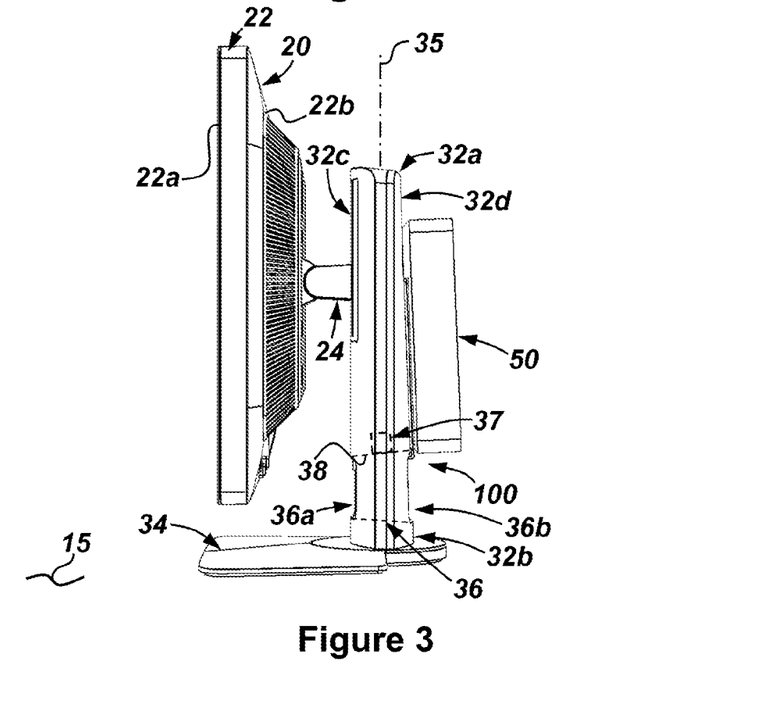
FIG. 3 is a side view of the computer system of FIG. 1 in accordance with the principles disclosed herein.

Referring now to FIGS. 1-3, a computer system 10 is shown. In general, system 10 comprises an electronic display 20, a support stand 30, an electronic device 50, and a mounting device 100. Display 20 further includes a generally rectangular shaped housing 22 having a first or front side 22a and a second or rear side 22b opposite the front side 22a. During use, display 20 projects or otherwise displays images from the front side 22a such that a user or operator (not shown) may view them.

Support stand 30 generally comprises a base 34, which engages a support surface 15 during operation, and column 32 coupled to base 34. Column 32 further includes a central axis 35, a first or upper end 32a, a second or lower end 32b opposite the upper end 32a, a first or front side 32c extending axially between the ends 32a, b, and a second or rear side 32d extending axially between the ends 32a, b and generally radially opposite the front side 32c. Column 32 couples to base 34 at the lower end 32b and, in this example, axis 35 extends in a direction normal to support surface 15.

Display 20 is mounted to column 32 through a display mount assembly 24. In particular, assembly 24 extends generally radially from the front side 32c of column 32 to rear side 22b of display 20. Assembly 24 may, in some examples, allow a user to move display 20 axially with respect to the axis 35 and/or to rotate display 20 about an axis (not shown) that is generally orthogonal to the axis 35. However, it should be appreciated that in other examples, display 20 is directly mounted to column 32 (i.e., no assembly 24 is included) while still complying with the principles disclosed herein.

A pass-through tunnel 36 extends generally radially from the rear side 32d to the front side 32c between the ends 32a, b, and includes a first of front opening 36a disposed at the front side 32c and a second or rear opening 36b disposed at the rear side 32b. Further, tunnel 36 is defined by an inner surface 38 extending between the openings 36a, b. In this example, surface 38 is generally formed as a truncated pyramid with rounded or radiused corners and thus, the front opening 36a has a smaller cross-sectional area than the rear opening 36b. A recess 37 extends into the tunnel from surface 38 in a direction that substantially normal to the surface 38. As will be described in more detail below, in some examples, tunnel 36 provides a pathway or access route for conductors (e.g., cables) which may, in some cases, be routed to and/or from display 20. Thus, for at least some examples, pass-through tunnel 36 may be referred to as a "cable tunnel."

Electronic device 50 is releasably secured to rear side 32d of column 32 through a mounting device 100, which is further mounted within pass-through tunnel 36. In some examples, electronic device may comprise a thin client device; however, it should be appreciated that electronic device 50 may comprise any device suitable for use in conjunction with system 10. For example, in other implementations, electronic device 50 may be an electronic display (e.g., display 20), an external hard-drive, a computer, a USB hub, a graphics adapter dongle, a wireless receiver for a keyboard, a mouse, an external antenna for a wireless network, a holster for a color calibration device, a notebook or laptop docking station, a transmitter/receiver for a wireless video recording device, a light, or some combination thereof.

Figure 4:
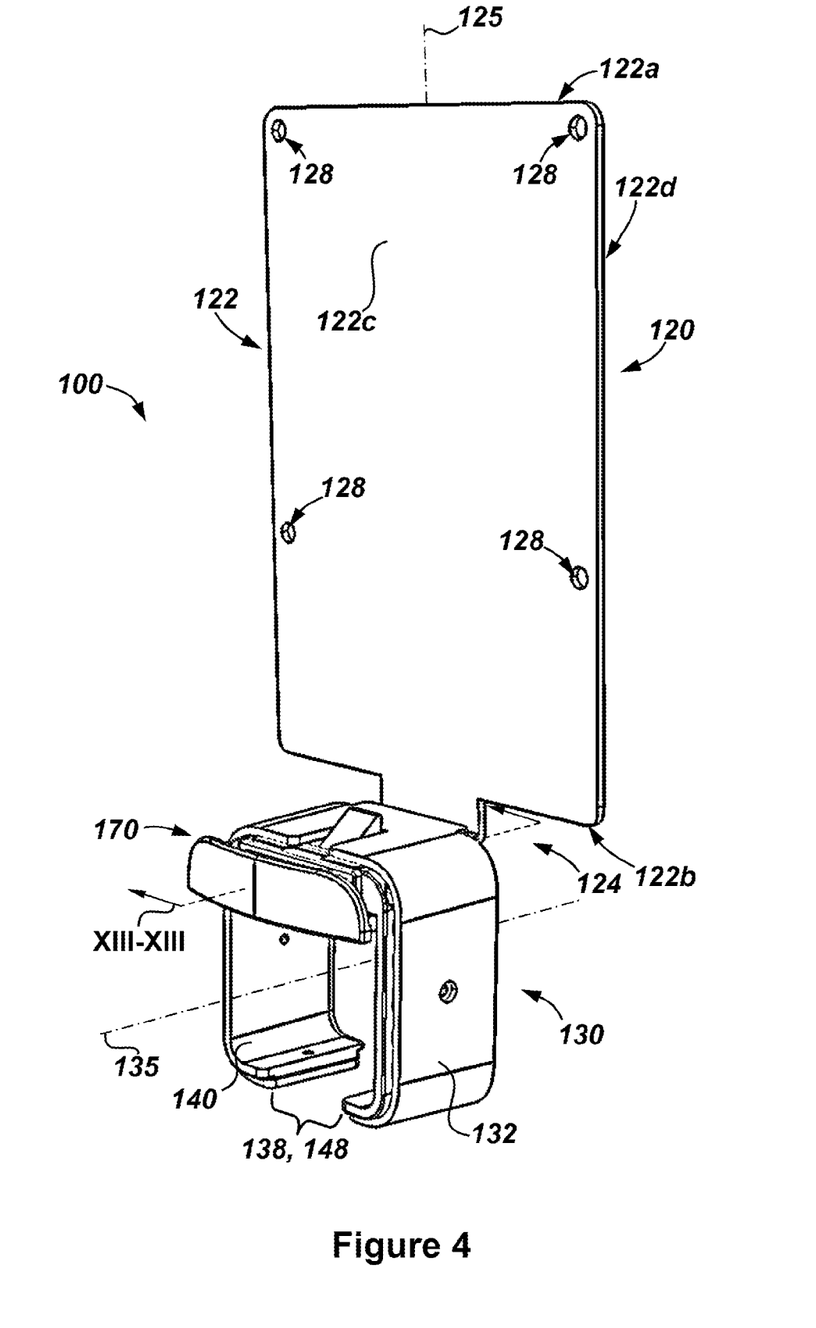
FIG. 4 is a perspective view of the mounting device of FIG. 1 in accordance with the principles disclosed herein.
Figure 5:
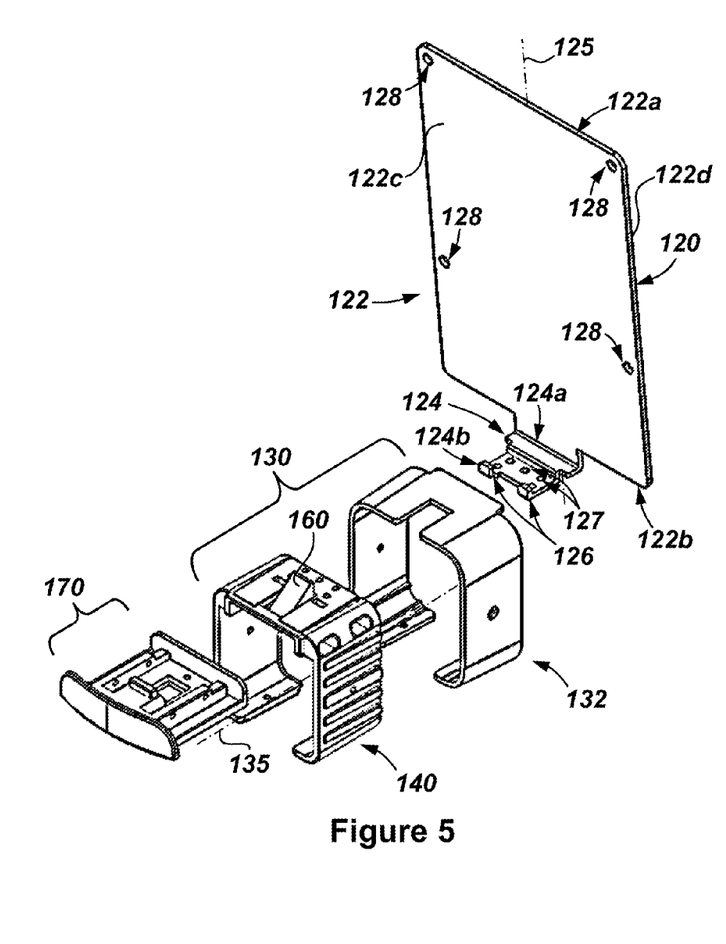
FIG. 5 is an exploded view of the mounting device of FIG. 1 in accordance with the principles disclosed herein.

Referring now to FIGS. 4 and 5, wherein the mounting device 100 is shown. Device 100 generally comprises a mounting bracket 120, an engagement assembly 130, and a releasing assembly 170. As will be described in more detail below, engagement assembly 130 engages with surface 38 of tunnel 36 thus securing device 100 therein, such that electronic device 50 may be mounted to bracket 120 during operations. Each of the above listed components and assemblies will now be described in more detail below.

Referring still to FIGS. 4 and 5, mounting bracket 120 generally comprises a first or a mounting section 122 and a second or an engagement section 124. Mounting section 122 is generally rectangular in shape and includes a central longitudinal axis 125, a first or upper end 122a, a second or lower end 122b opposite the upper end 122a, a first or front side 122c extending between the ends 122a, b, and a second or outer side 122d radially opposite the inner side 122c and also extending between the ends 122a, b. A plurality of apertures or throughbores 128 is disposed in section 122 extending between the sides 122c, d. In this implementation, the arrangement of throughbores 128 on section 122 complies with standard pattern arrangements used in the electronics/computing industry, such as, for example, those designed by the Video Electronics Standards Association ("VESA"); however, it should be appreciated that other arrangements may be used for throughbores 128 while still complying with the principles disclosed herein. During operation, throughbores 128 are aligned with corresponding apertures and/or throughbores (not shown) on electronic device 50 (see FIGS. 1-3) such that connecting members (not shown) (e.g., screws, bolts, pins, etc.) may be inserted through both the throughbores 128 and the corresponding apertures on device 50 to mount device 50 to bracket 120.

As is best shown in FIG. 5, engagement section 124 extends substantially radially from the lower end 122b of mounting section 122, previously described, and generally includes a first or proximate end 124a coupled to lower end 122b of section 122 and a second or distal end 124b opposite the proximate end 124a. In this example, a pair of tabs 126 extends axially upward from the distal end 124b. As will be described in more detail below, tabs 126 are configured to engage with corresponding apertures in engagement assembly 130 during makeup of device 100. Further, a plurality of apertures or throughbores 127 extends axially within section 124. As will also be described in more detail below, at least some of the throughbores 127 receive connecting members (not shown) to mount bracket 120 to assembly 130 during makeup operations.

Referring still to FIGS. 4 and 5, in this example engagement assembly 130 generally comprises a central axis 135, an outer sleeve or collar 132, an inner sleeve or collar 140, and a latch 160. As will be described in more detail below, during assembly, latch 160 is coupled to inner collar 140 which is further disposed within outer collar 132. Thereafter, assembly 130 may be mounted within tunnel 36 (see FIGS. 1-3) such that collar 132 engages surface 38 of tunnel 36.

Figure 6:
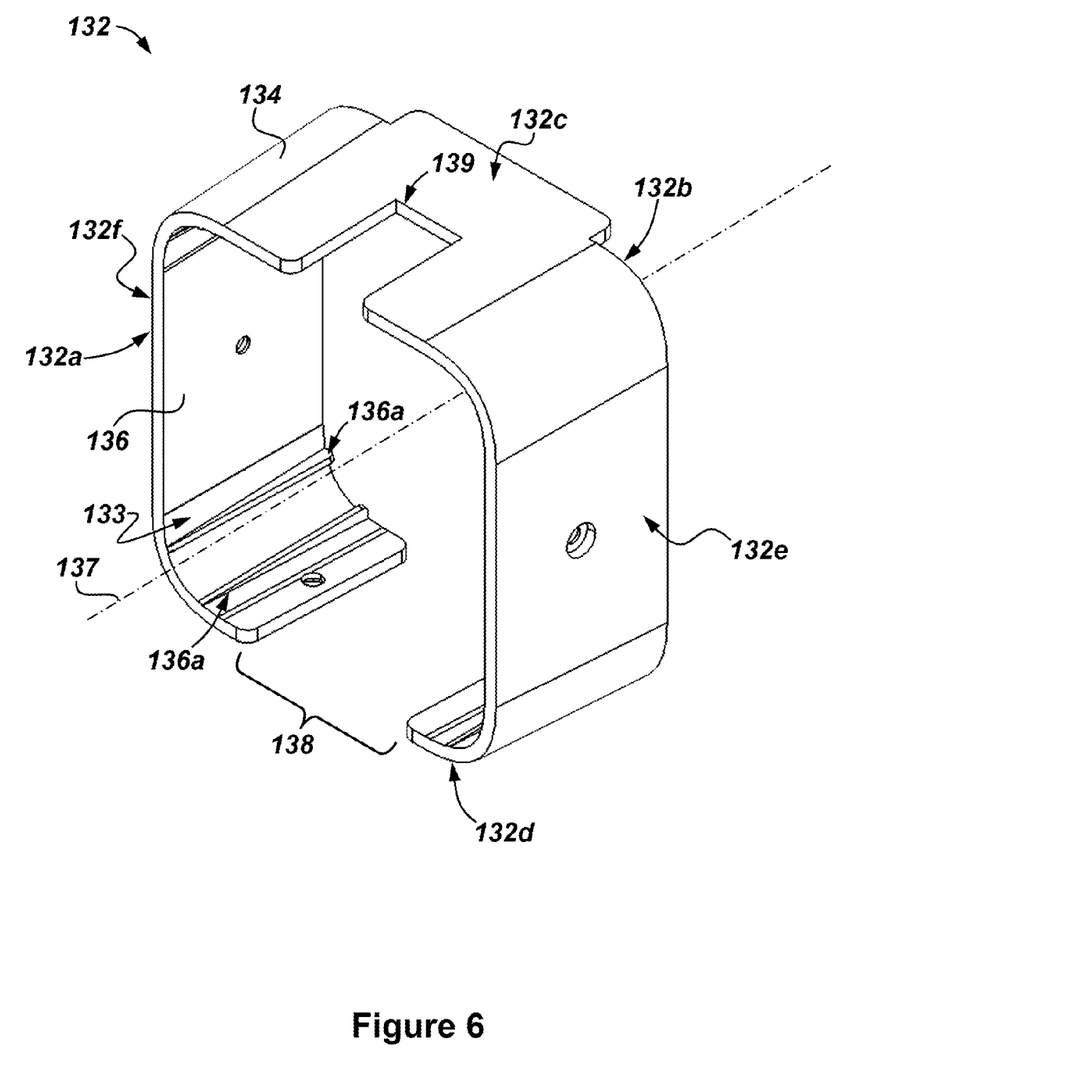
FIG. 6 is a perspective view of the outer collar or the mounting device of FIG. 1 in accordance with the principles disclosed herein.

Referring now to FIG. 6, collar 132 generally comprises a central axis 137 that is aligned with the axis 135 during operation, a first or front end 132a, a second or rear end 132b opposite the front end 132a, a top side 132c, a bottom side 132d radially opposite top side 132c, a first lateral side 132e, and a second lateral side 132f radially opposite the first lateral side 132e. In addition, collar 132 includes a radially outer surface 134 extending axially between the ends 132a, b, and a radially inner surface 136 also extending axially between the ends 132a, b. Inner surface 136 further defines an inner passage 133 extending between the ends 132a, b and includes a plurality of ramped rails 136a extending along surface 136 between ends 132a, b. As will be described in more detail below, passage 133 receives inner collar 140 such that rails 136a slidingly engage collar 140 during makeup of assembly 130. Further, in at least some examples, the surface 134 slidingly engages the surface 38 of tunnel and thus, generally conforms or corresponds to the surface 38. As a result, in this example, surface 134 is formed in a generally truncated pyramid shape with rounded or radiused corners. Also, in this example, radially inner surface 136 has the same general shape as surface 134; however, it should be noted that in other examples, surface 136 may have a different shape than the surface 134 while still complying with the principles disclosed herein. An abscess or break 138 extends along bottom side 132d both radially between the surfaces 134, 136 and axially between the ends 132a, b, thus making collar 132 substantially C-shaped in cross-section. Further, a recess 139 extends along top side 132c axially from end 132a into the surfaces 134,136. As will be described in more detail below, recess 139 allows at least a portion of latch 160 to pass therethrough when device 100 is fully assembled.

Figure 7:
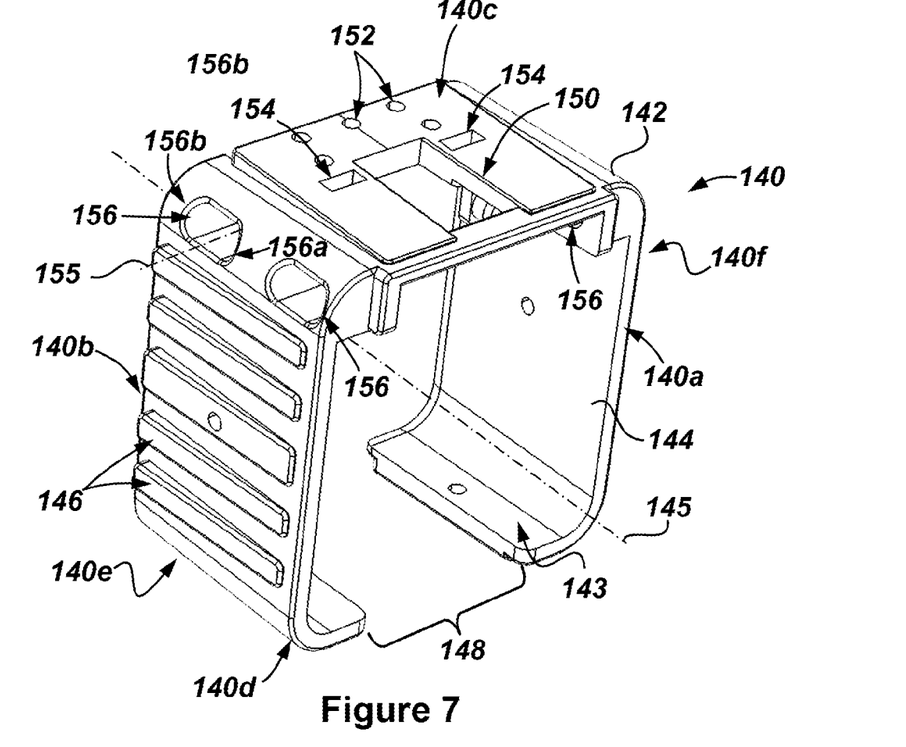
FIG. 7 is a perspective view of the inner collar of the mounting device of FIG. 1 in accordance with the principles disclosed herein.
Figure 8:
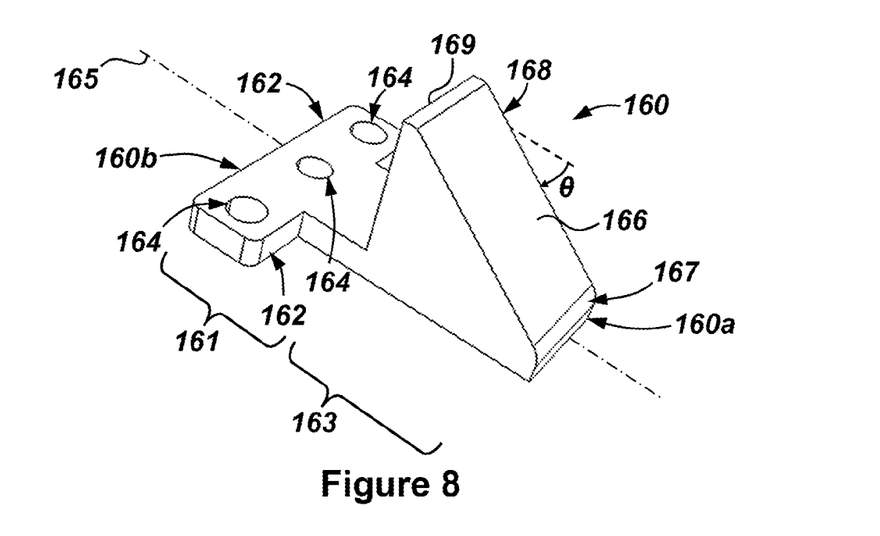
FIG. 8 is a perspective view of the latch of the mounting device of FIG. 1 in accordance with the principles disclosed herein.

Referring now to FIGS. 5, 7, and 8, inner collar 140 generally comprises a central axis 145 that is aligned with the axes 135, 137 during operation, a first or front end 140a, a second or rear end 140b opposite the front end 140a, a top side 140c, a bottom side 140d radially opposite top side 140c, a first lateral side 140e, and a second lateral side 140f radially opposite the first lateral side 140e. In addition, collar 140 includes a radially outer surface 142 extending axially between the ends 140a, b and a radially inner surface 144 also extending axially between the ends 140a, b. Inner surface 144 defines an inner passage 143 extending between the ends 142a, b. As will be described in more detail below, passage 143 provides a path for conductors or cables when assembly 130 is installed within tunnel 36. A plurality of projections 146 extends outward from the surface 142. As will be described in more detail below, in this example, projections 146 slidingly engage the surface 136 of collar 132 when collar 140 is installed within passage 133. An abscess or break 148 extends along bottom side 140d both radially between the surfaces 142, 144 and axially between the ends 140a, b, thus making collar 140 substantially C-shaped in cross-section. As is best shown in FIGS. 4 and 5, the break 148 is substantially angularly aligned with the break 138 with respect to the axes 135, 145 when collar 140 is fully installed within recess 133 of collar 132. Top side 140c includes a pair of generally rectangular apertures 154 extending from surface 142 to surface 144. In addition, top side 140c further includes a substantially rectangular aperture 150 extending generally radially from the surface 142 to surface 144 that is angularly disposed between the apertures 154. Further, a plurality of cylindrical throughbores 152 also extends from surface 142 to surface 144 along top side 140c. As will be described in more detail below, during makeup of assembly 130, the throughbores 152 substantially align with the throughbores 127 on bracket 120, the apertures 154 receive the tabs 126 on bracket 120, and the aperture 150 is substantially aligned with the recess 139.

Collar 140 also comprises a plurality of slots 156 extending from surface 142 to surface 144 along the sides 140e, f. Each slot 156 is aligned with an axis 155 that is substantially perpendicular to the axis 145 and includes a first or inner end 156a and a second or outer end 156b radially opposite the inner end 156a with respect to axis 155. In this example, a total of four slots 156 are included—two slots disposed on the side 140e and two slots disposed on the side 140f. However, it should be appreciated that the number and arrangement of slots 156 may be varied while still complying with the principles disclosed herein.

Referring now to FIG. 8, latch 160 generally comprises a central axis 165 that is oriented generally parallel to the axes 135, 145 during operation, a first or front end 160a, a second or rear end 160b opposite the front end 160a, a coupling section 161 extending axially inward from the rear end 160b, and an engagement section 163 extending axially from the front end 160a to coupling section 161. Coupling section 161 includes a pair of mounting tabs 162 projecting radially outward from the outer end 160b with respect to axis 165, and a plurality of apertures or throughbores 164 extending therethrough. In this example, a total of three throughbores 164 extend through section 161; however, it should be appreciated that, in other examples, the number and arrangement of throughbores 164 may be varied while still complying with the principles disclosed herein. For example, in other examples, only two throughbores 164 are included in latch 160, such that each throughbore 164 extends through one of the tabs 162. Additionally, in this example, each of the throughbores 164 is positioned such that it is substantially aligned with one of the plurality of throughbores 152 of collar 140 and one of the throughbores 127 of bracket 120 when assembly 130 is fully assembled.

Engagement section 163 comprises a radially oriented projection 168 that is further defined by a radially oriented planar surface 169, a ramped surface 166 disposed at an angle θ with respect to axis 165, and a radiused or curved engagement surface 167. In some examples, θ may range from 10° to 140°. In this example, θ is equal to approximately 40°. As will be explained in more detail below, projection 168 engages with recess 37 in tunnel 36 when device 100 is fully inserted therein.

Latch 160 may comprise any material that is compliant enough to allow for some amount of elastic deformation of section 163 relative to section 161 while still also retaining enough rigidity to effectively lock device 100 within tunnel 36 during operations. For example, in some implementations, latch 160 comprises a plastic; however, in other implementations, latch 160 may comprise a metal, or a composite while still complying with the principles disclosed herein.

Figure 9:
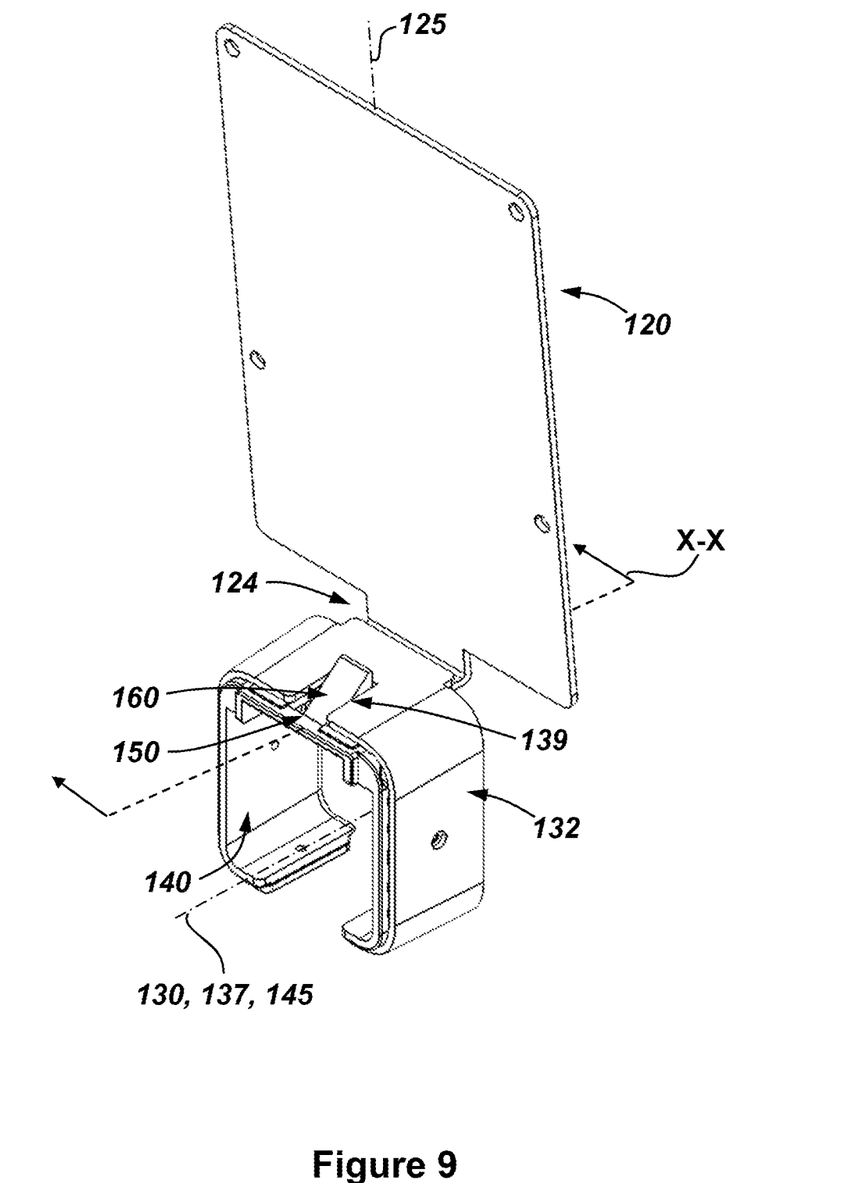
FIG. 9 is a perspective view of the engagement assembly of the mounting device of FIG. 1 in accordance with the principles disclosed herein.
Figure 10:
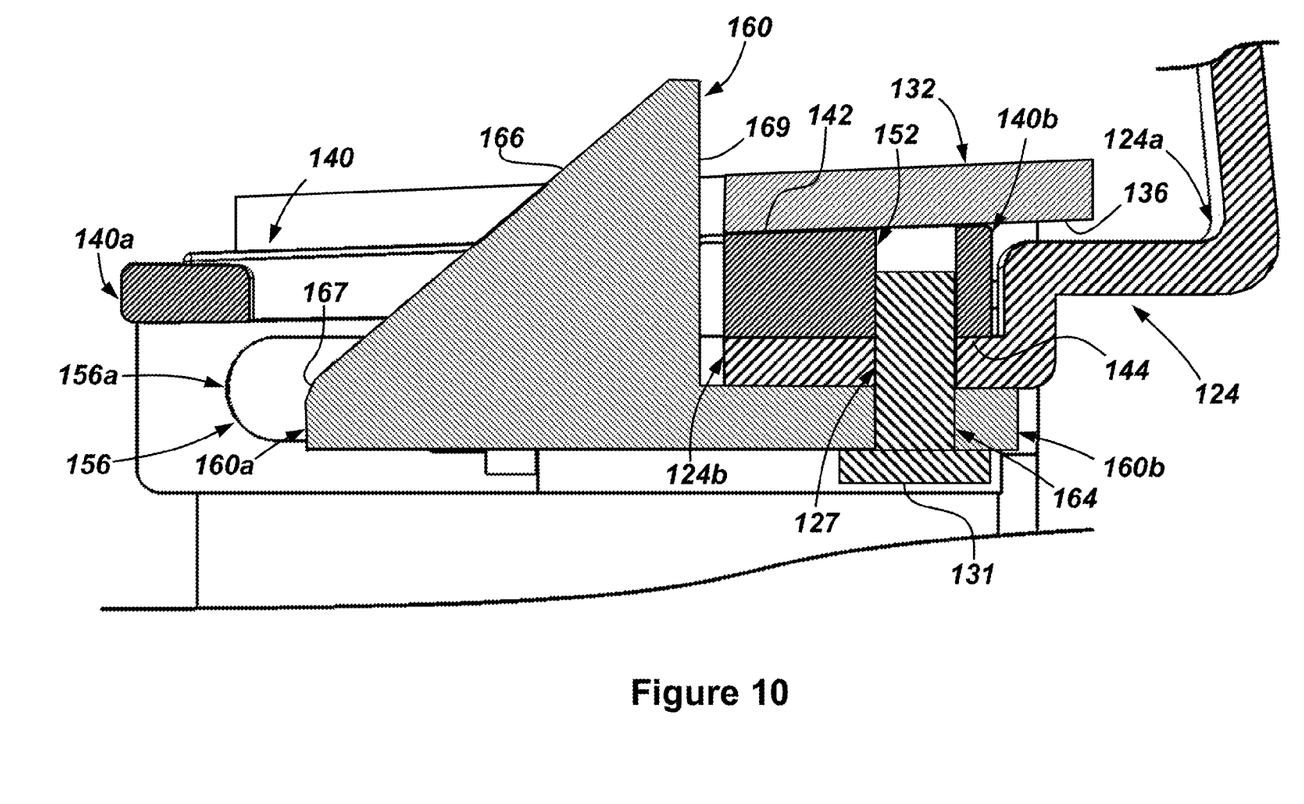
FIG. 10 is a cross-sectional view taken along section X-X in FIG. 9 in accordance with the principles disclosed herein.

Referring now to FIGS. 9 and 10, engagement section 124 of bracket 120 is installed on collar 140 by inserting the tabs 126 into apertures 154, thus aligning throughbores 127 on section 124 with throughbores 152 on collar 140. Thereafter, latch 160 is inserted within the passage 143 such that projection 168 is received within recess 150 and throughbores are 164 aligned with three of the throughbores 127 on engagement section 124 of bracket 120. Thereafter, latch 160, bracket 120, and collar 140 are secured to one another with a plurality of connecting members 131 (note: only one connecting member 131 is shown in FIG. 10). In this example, each connecting member 131 is a screw and is rotatably received within the aligned apertures 164, 127, 152 such that external threads disposed along each member 131 engage with corresponding internal threads within one of the throughbores 152. In this example, a total of three connecting members 131 are used to couple latch 160, bracket 120, and collar 140 to one another due to the fact that only three throughbores 164 are included in latch 160; however, it should be appreciated that the number and arrangement of connecting members 131 may be greater or less than three while still complying with the principles disclosed herein. The assembled collar 140, bracket 120, and latch 160 are then inserted within passage 133 of collar 132 such that rails 136a slidingly engage surface 142 and projections 146 slidingly engage surface 136.

Figure 11:
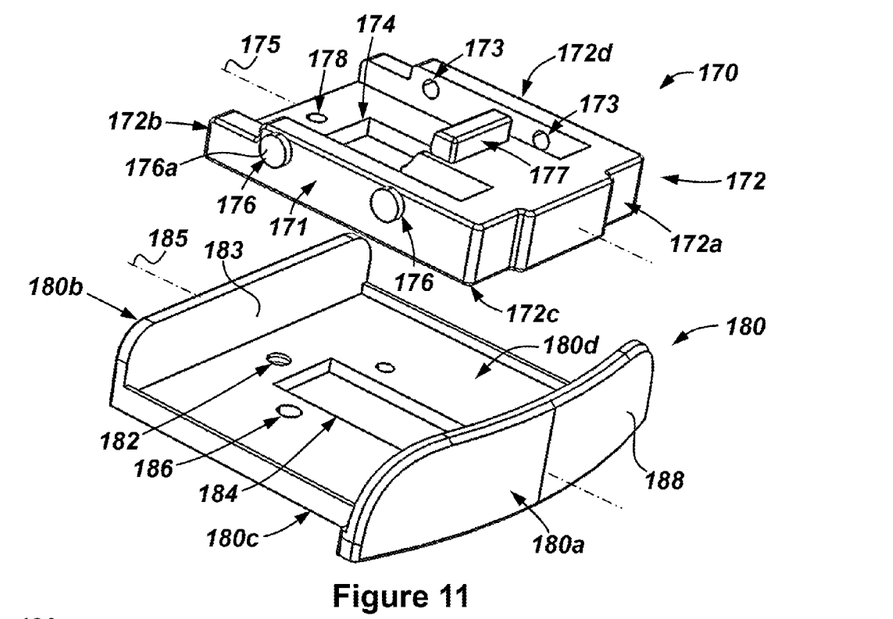
FIG. 11 is an exploded view of the releasing assembly of the mounting device of FIG. 1 in accordance with the principles disclosed herein.
Figure 12:
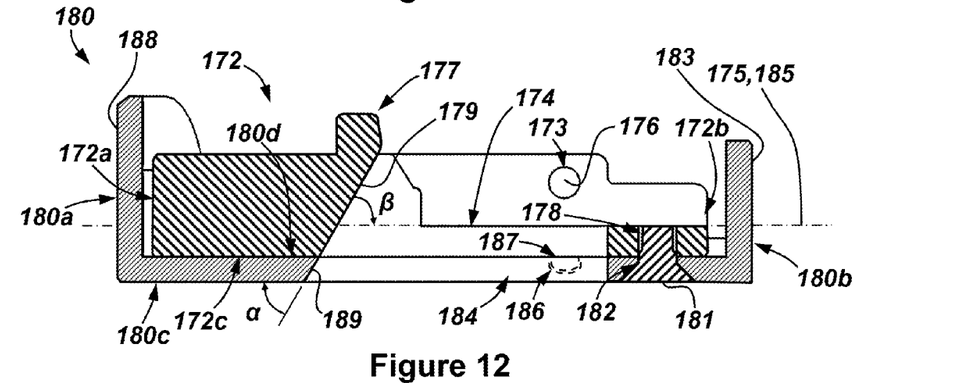
FIG. 12 is a cross-sectional view taken along section XII-XII in FIG. 5 in accordance with the principles disclosed herein.

Referring now to FIGS. 5, 11, and 12, releasing assembly 170 is disposed within passage 143 of collar 140 when device 100 is fully assembled and, as is described in more detail below, is actuatable to release or unlock device 100 from tunnel 36 during operations. Referring specifically to FIGS. 11 and 12, assembly 170 generally comprises a carriage 172 and a button 180. Carriage 172 generally comprises a central longitudinal axis 175, a first or front end 172a, a second or rear end 172b opposite the front end 172a, a bottom side 172c extending axially between the ends 172a, b, and a top side 172d radially opposite the bottom side 172c and also extending axially between the ends 172a, b. A pair of side walls 171 are disposed radially opposite one another about the axis 175 and extend axially between the ends 172a, b. As is best shown in FIG. 12, in this example, a pair of projections 187 extends outward from the bottom side 172c (note: only one projection 187 is shown with a hidden line in FIG. 12). Further, a plurality of apertures or throughbores extends substantially radially through walls 171. In this example, a total of four throughbores 173 extend through walls 171—two throughbores 173 in one wall 171 and two throughbores 173 in the other wall 171. A guide post 176 including a head 176a is disposed within each throughbore. As will be explained in more detail below, head 176a of each post 176 engages one of the slots 156 on collar 140 during operation to guide carriage within passage 143. A rectangular aperture 174 extends radially through carriage 172 from top side 172d to bottom side 172c thereby defining an open passage through carriage 172. Further, and as is best shown in FIG. 12, an engagement member 177 extends axially from the front end 172 that further includes a substantially planar, ramped engagement surface 179 disposed at an angle β with respect to the axis 175. In some examples, the angle β may range from 0° to 90°. Further, as will be described in more detail below, in some examples the angle β is chosen in order to maintain sufficient clearance between the surface 179 and the surface 166 of latch 160 and to maximize the amount of deflection of section 163 of latch 160 when surface 179 engages surface 167 during operation.

Referring still to FIGS. 11 and 12, button generally comprises a central longitudinal axis 185, a first or front end 180a, a second or rear end 180b opposite the front end 180a, a bottom side 180c extending axially between the ends 180a,b, and a top side 180d also extending between the ends 180a, b. Also, front end 180a further comprises an engagement wall 188 extending radially therefrom, and rear end 180b comprises a retaining wall 183 extending radially therefrom. A rectangular recess or aperture 184 extends through button from top side 180d to bottom side 180c. In this example, aperture 184 is at least partially defined by a ramped surface 189 which is oriented at the angle α with respect to the axis 185. In some examples, the angle α may range from 0° to 90°. In this example, the angle α is substantially equal to the angle β previously described; however, it should be appreciated that in other examples, the angles α and β may not be equal while still complying with the principles disclosed herein. Further, button 180 includes a throughbore 182 extending between sides 180c, d. Additionally, button 180 also comprises a pair of throughbores 186 extending between sides 180c, d. As will be explained in more detail below, during makeup of assembly 170, throughbore 182 aligns with throughbore 178 while throughbores 186 receive corresponding projections 187 extending outward from the surface 172c of carriage 172.

Referring specifically now to FIG. 12, during makeup of assembly 170, carriage 172 is disposed on top side 180d of button and secured thereto. In particular, bottom side 172c of carriage 172 engages with top side 180d of button 180 such that the throughbores 182, 178 align with one another, the throughbores 186 on button 180 receive the corresponding projections 187, and the recesses 174, 184 align with one another. A connecting member 181 is then inserted within throughbores 178, 182 such that carriage 170 and button 180 are secured to one another. Further, in this example, member 181 is a screw that has external threads that correspond with internal threads disposed within the throughbore 178 on carriage 170. Once assembled, end 180a is proximate end 172a and end 180b is proximate end 172b.

Figure 13:
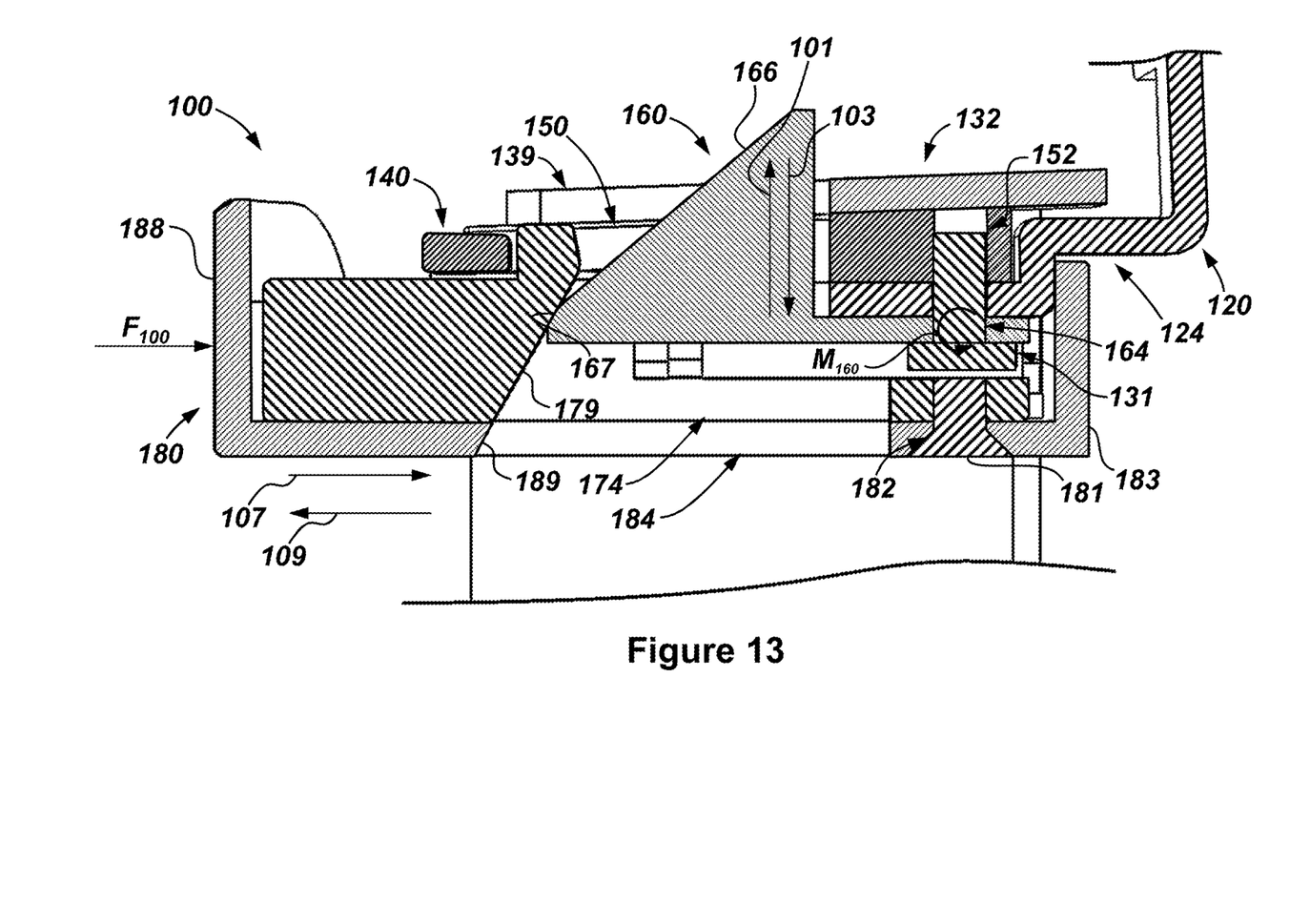
FIG. 13 is a cross-sectional view taken along section XIII-XIII in FIG. 4 in accordance with the principles disclosed herein.

Referring now to FIGS. 4 and 13, in order to fully assemble device 100, the releasing assembly 170 and the engagement assembly 130 are each assembled as previously described. Guide posts 176 are either removed or not installed within throughbores 173. Thereafter, the releasing assembly 170 (with guide posts 176 uninstalled) is inserted within the passage 143 of collar 140 such that the throughbores 173 on carriage 172 (see FIG. 11) align with slots 156 on collar 140 (see FIG. 7). Guide posts 176 may then be inserted through slots 156 and, in this example, are threadably engaged within throughbores 173 such that carriage 172 and thus assembly 170 is supported by posts 176 within slots 156.

Because slots 156 are elongated, posts 176 may slidingly engage slots 156, thus allowing assembly 170 to traverse along the axes 175, 185 relative to assembly 130. In particular, assembly 170 may move along a direction 107 in response to an input force $F_{100}$ applied to wall 188 on button 180, such that each post 176 moves within one of the slots 156 from the end 156a toward the end 156b. As assembly 130 moves along the direction 107, the surface 179 on carriage 172 slidingly engages with the surface 167 on latch 160. Because surface 179 is ramped or inclined as previously described, as assembly 170 moves in the direction 107 engagement between the surfaces 167, 179 causes section 163 of member 160 to be deflected toward the apertures 174, 184 or along the direction 103 relative to section 161, thus resulting in a bending moment $M_{161}$ applied to section 161 about the throughbore 164. Once force $F_{100}$ and moment $M_{161}$ cease, member 160 returns to its original orientation such that projection 168 and section 163 of member 160 move away from the apertures 174, 184 and toward the aperture 150 and recess 139, along the direction 101. As section 161 moves along the direction 101, the surface 167 slidingly engages the surface 179 and thus urges carriage 172 and assembly 170 along the direction 109. As a result, assembly 170 is biased outward or in the direction 109 when device 100 is fully assembled. As previously described above, the angle β of surface 179 is chosen such that sufficient clearance is maintained between surfaces 179, 166 as assembly 170 traverses along the directions 107, 109, and the deflection of section 163 of latch 160 along the directions 101, 103 is maximized during operation.

Figure 14:
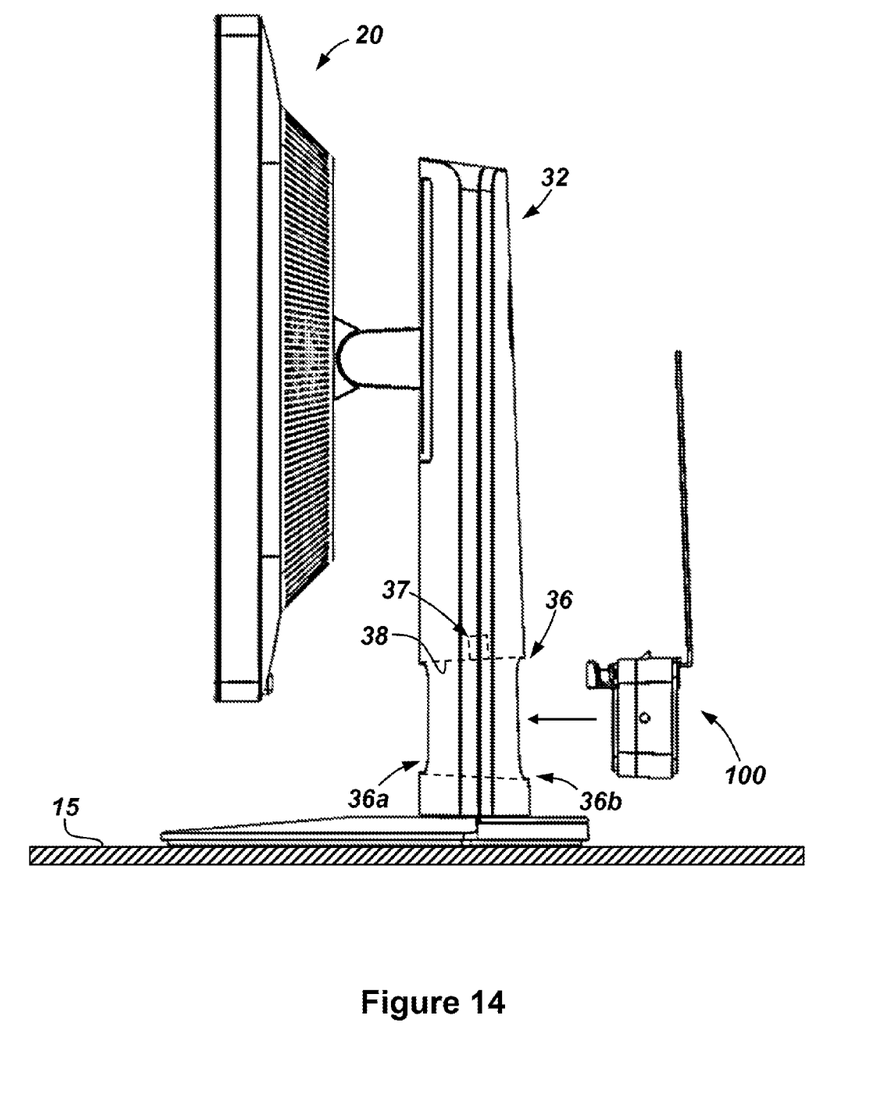
FIG. 14 is a schematic side view showing the mounting device of FIG. 1 being inserted installed within a pass-through tunnel of a support stand of the computer system of FIG. 1 in accordance with the principles disclosed herein.

Referring now to FIGS. 3 and 14, during operation, device 100 is inserted into rear opening 36b of tunnel 36 such that the surface 134 on outer collar 132 slidingly engages the surface 38 within tunnel. Additionally, because the surface 166 is disposed at an angle θ as previously described, insertion of device 100 within tunnel 36 facilitates sliding engagement of surface 166 of latch 160 and surface 38 of tunnel 36, thereby deflecting section 163 of latch 160 toward the apertures 174, 184 of assembly 170 in the manner previously described above. Once device 100 is fully inserted within tunnel 36, projection 168 aligns with the recess 37 and thus engages therewith (e.g., by moving along the direction 101 shown in FIG. 13), allowing the surface 169 of projection 168 to engage with the inner surface of recess 37, and thereby securing or locking device 100 within tunnel 36. Thereafter, electronic device 50 may be mounted to mounting section 122 of bracket. Because collars 132, 140 include inner passages 133, 143, respectively, as previously described, conductor(s) may still be routed through tunnel 36 after device 100 is installed therein. Additionally, because collars 132, 140 further include breaks 138, 148, respectively, device 100 may be installed within tunnel 36 without first having to withdrawal any conductors already routed therein.

If at some point during operation, it becomes desirable to withdrawal or un-install device 100 from tunnel 36, a user or operator may push on surface 188 of button (e.g., force $F_{100}$), thereby forcing projection 168 of latch 160 away from recess 37 (e.g., along the direction 103 shown in FIG. 13) in the manner described above. Once projection 168 of latch 160 is fully withdrawn from recess 37, device 100 may be un-installed from tunnel 36.

Through use of a mounting device (e.g., device 100) in accordance with the principles disclosed herein, it is possible to mount an electronic device (e.g., device 50) within a pass-through tunnel (e.g., tunnel 36) of a support stand (e.g., stand 30) for an electronic display (e.g., display 20). In addition, through use of a mounting device in accordance with the principles disclosed herein, one may install and uninstall the mounting device within the pass-through tunnel of the support stand without the use of tools. Further, a user or operator of the mounting device may still route conductors through the pass-through tunnel once the device is installed therein. Still further, a user or operator may install the mounting device within the pass-through tunnel without first having to uninstall any conductors or cables which are already routed therethrough since the collars are generally C-shaped in cross-section for at least some examples, as previously described.

While examples disclosed and described herein have included both an inner collar 140 and an outer collar 132, in some example, only the inner collar 140 may be included while still complying with the principles disclosed herein. In these examples, the collar 140 directly engages the inner surface 38 of tunnel 36 during operations. While examples described and disclosed herein have described tunnel 36 as having a surface 38 which is generally formed is the shape of a truncated pyramid, it should be appreciated that the specific shape of surface 38 of tunnel 36 may be varied greatly while still complying with the principles disclosed herein. For example, in other implementations, surface 38 may be generally frustoconical, cylindrical, etc. In addition, while examples described and disclosed herein have described the front opening 36a of tunnel 36 as having a smaller cross-sectional area than the rear opening 36b, it should be appreciated that, in some examples, the opening 36b may have a smaller cross-sectional area than opening 36a, and in still other examples, the openings 36a, b, may have substantially the same cross-sectional area while still complying with the principles disclosed herein. For example, in one implementation, surface 38 is cylindrical such that the openings 36a, b have substantially the same cross-sectional area. Further, while the recess 37 has been described herein as being rectangular in shape, in other examples, the shape, arrangement, and size of recess 37 may be varied while still complying with the principles disclosed herein. Also, while mounting section 122 of mounting bracket 120 has been described and shown herein as being substantially rectangular in shape, it should be noted that other shapes (e.g., circular, octagonal, hexagonal, etc. . . . ) are possible while still complying with the principles disclosed herein.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A mounting device, comprising:
   a collar to mount within a pass-through tunnel of a support stand for an electronic display, the collar being sized to engage an inner surface of the pass-through tunnel;
   a mounting bracket coupled to the collar, the mounting bracket to provide a mounting surface for an electronic device;
   a latch to engage a recess disposed on the inner surface of the pass-through tunnel, wherein the collar is secured within the pass-through tunnel when the latch engages the recess; and
   a releasing assembly slidably disposed on the collar, the releasing assembly including a ramped surface to engage with a corresponding curved surface on the latch;
   wherein the latch is disengaged from the recess when the releasing assembly actuates relative to the collar.

2. The mounting device of claim 1, wherein the mounting collar includes a break, wherein the break is to receive a conductor when the collar is installed within the pass-through tunnel.

3. The mounting device of claim 1, wherein the mounting bracket further comprises a mounting surface with a plurality of mounting apertures disposed therein.

4. The mounting device of claim 3, wherein the mounting surface comprises four mounting apertures arranged in a rectangular pattern on the mounting surface.

5. The mounting device of claim 1, wherein the electronic device comprises one of a thin client device, a computer, an electronic display, and an external hard drive.

6. The mounting device of claim 1, wherein the collar is substantially C-shaped in cross-section.

7. The mounting device of claim 1, wherein the latch comprises a compliant material.

8. The mounting device of claim 1, wherein the latch is one of a metal and a composite material.

9. A system for mounting an electronic device, comprising:
   a support stand to support an electronic display, the support stand further including a pass-through tunnel;
   a collar to mount within the pass-through tunnel, the collar being sized to engage an inner surface of the pass-through tunnel; and
   a mounting bracket coupled to the collar, the mounting bracket to provide a mounting surface for the electronic device;
   a latch to engage a recess disposed on the inner surface of the pass-through tunnel, wherein the collar is secured within the pass-through tunnel when the latch engages the recess; and
   a releasing assembly slidably disposed on the collar, the releasing assembly including a ramped surface to engage with a corresponding curved surface on the latch;
   wherein the latch is disengaged from the recess when the releasing assembly actuates relative to the collar;
   and further wherein the collar is arranged for tool-less removal from the pass-through tunnel.

10. The system of claim 9, wherein the mounting collar includes a break, wherein the break is to receive a conductor when the collar is installed within the pass-through tunnel.

11. The system of claim 9, wherein the mounting bracket further comprises a mounting surface with a plurality of mounting apertures disposed therein.

12. The system of claim 11, wherein the mounting surface comprises four mounting apertures arranged in a rectangular pattern on the mounting surface.

13. The system of claim 9, wherein the electronic device comprises one of a thin client device, a computer, an electronic display, and an external hard drive.

14. The system of claim 9, wherein the collar is substantially C-shaped in cross-section.

15. The system of claim 9, wherein the latch comprises a compliant material.

16. The system of claim 9, wherein the latch is one of a metal and a composite material.

17. A computer system, comprising:
   an electronic display;
   a support stand to support the electronic display, the support stand including a pass-through tunnel to receive a conductor therein;
   a mounting device comprising a collar to mount within the pass-through tunnel, the collar being sized to engage an inner surface of the pass-through tunnel, and a mounting bracket coupled to the collar, the mounting bracket to provide a mounting surface for the electronic device, the mounting device to mount within the pass-through tunnel such that the conductor may still pass therethrough;
   a latch to engage a recess disposed on the inner surface of the pass-through tunnel, wherein the collar is secured within the pass-through tunnel when the latch engages the recess;
   a releasing assembly slidably disposed on the collar, the releasing assembly including a ramped surface to engage with a corresponding curved surface on the latch, wherein the latch is disengaged from the recess when the releasing assembly actuates relative to the collar; and
   an electronic device coupled to the mounting device.

18. The computer system of claim 17, wherein the electronic device comprises one of a thin client device, a computer, an electronic display, and an external hard drive.

19. The computer system of claim 17, wherein the latch comprises a compliant material.

20. The computer system of claim 17, wherein the latch is one of a metal and a composite material.

* * * * *